United States Patent

Nagin

[15] 3,645,146
[45] Feb. 29, 1972

[54] INTERLOCKING CHAIN STRUCTURE

[72] Inventor: Tony Nagin, 14016 South Indiana Ave., Chicago, Ill. 60627

[22] Filed: Sept. 29, 1969

[21] Appl. No.: 861,583

[52] U.S. Cl. .................................... 74/89.21, 254/133 R
[51] Int. Cl. ........................................... F16h 27/02
[58] Field of Search .............. 74/89.21; 305/47, 48, 49, 50; 24/205, 205.13, 205.15; 214/34, 514; 264/95

[56] References Cited

UNITED STATES PATENTS

| 2,343,348 | 3/1944 | Wahl | 24/205.13 |
| 2,375,461 | 5/1945 | Bender | 264/95 |
| 3,082,893 | 3/1963 | Hollings et al. | 214/34 |
| 2,554,300 | 5/1951 | Hayakawa | 264/95 |

Primary Examiner—Milton Kaufman
Assistant Examiner—Wesley S. Ratliff, Jr.
Attorney—Hill, Sherman, Meroni, Gross & Simpson

[57] ABSTRACT

An interlocking rigid chain structure comprising a pair of roller-type chains having hooklike elements constructed to interlock with one another as the chains pass between two sprockets to form a rigid assembly in which the chains of such assembly may be separated by movement of the latter in reverse direction between said sprockets.

11 Claims, 3 Drawing Figures

PATENTED FEB 29 1972
3,645,146
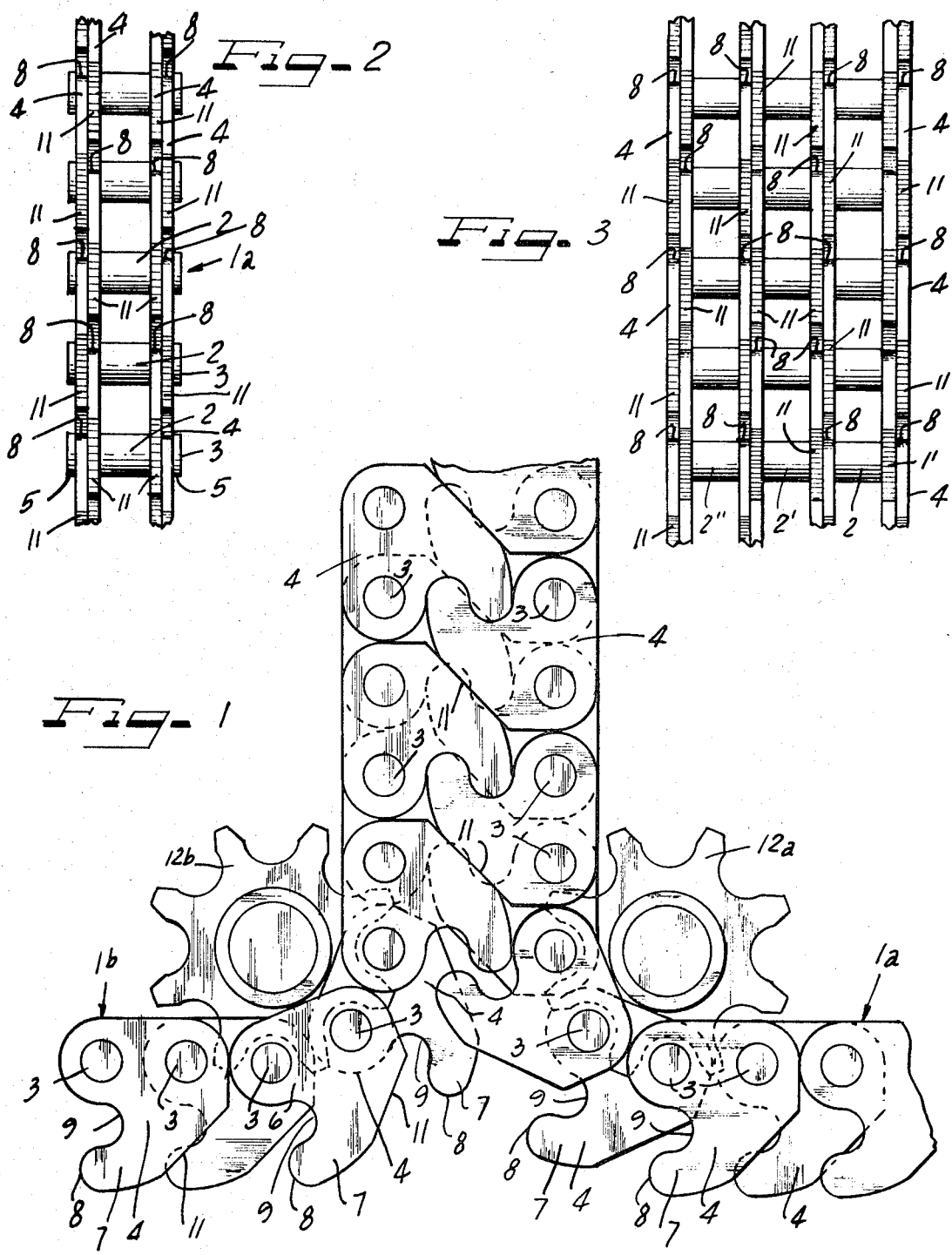
INVENTOR.
TONY NAGIN
BY Hill, Sherman, Meroni, Gross & Simpson ATTORNEYS

INTERLOCKING CHAIN STRUCTURE

BACKGROUND OF THE INVENTION

Roller-type chain has been in use for many years, being employed as a power transmission structure adapted to conduct power from a driving sprocket to a driven sprocket, etc. More recently roller-type chain, with specially designed sideplate constructions have been employed to transmit compression or pusher forces, derived from a sprocket associated with the chain to an object to be acted upon. An example of such type of chain is illustrated in my prior U.S. Pat. No. 3,021,024, granted on Feb. 13, 1962, in which such type of chain is employed in connection with a pusher mechanism for a forklift truck or the like. Such type of chain employed sideplates connecting adjacent chain links which were so constructed that the chain, when extended in a straight line would permit flexing in one transverse direction but would oppose flexing in the opposite direction and would thus enable the transmission of push or compression forces, flexing of the chain being prevented by a suitably disposed guide member along which the chain traveled. In the particular patent referred to, two forms of chain were illustrated, in one of which the sideplates were provided with transverse edges which were adapted to abut one another when the chain was disposed in a straight line, while the other embodiment employed an overlapping arrangement which prevented undesired flexing in the one direction.

The present invention is directed to a chain structure employing at least one pair of roller-type chains in which each chain is provided with a series of hooklike elements which may be engaged with one another to form an interlocked assembly which possesses a very high degree of rigidity, the respective chains being readily interlocked or separated when desired.

BRIEF SUMMARY OF THE INVENTION

The invention is directed to a chain structure employing one or more series of roller elements which are operatively connected by a plurality of pairs of sideplates, each pair connecting one roller with one of the adjacent rollers. The sideplates may be interconnected in the usual manner by pins or rivets which pass through the respective rollers and have their ends suitably secured to the sideplates whereby disconnection therebetween is prevented. A common arrangement is to form a rivet head on the end of each pin.

In such construction the sideplates disposed at the roller ends are arranged in a plurality of parallel series. Preferably the sideplates of at least one of such series are each provided with a hooklike element thereon which is adapted to engage a like hook element of a reversely disposed cooperable chain. Thus, a pair of chains so constructed may be disposed with the hook elements of one chain facing the hook elements of the other chain and adapted to be interlocked with one another. This may be readily accomplished by passing the respective chains between a pair of sprockets rotatable on parallel axes, in which each chain extends partially around its associated sprocket so that the trailing ends of the two chains diverge prior to engagement thereof with their associated sprocket. As the two chains pass between the two sprockets the hook elements are interlocked in a manner quite similar to the interlocking action of a zipper closure. The resulting interlocked chains form an assembly which is extremely rigid and may be used to transmit forces without the extensive use of guide means. Chain constructed in accordance with the present invention may utilize only a single series of rollers or may be of multiple construction employing a plurality of roller series, as is known in the art.

BRIEF DESCRIPTION OF DRAWINGS

Other objects, features and advantages of the invention will be readily apparent from the following description of certain preferred embodiments thereof, taken in conjunction with the accompanying drawings, in which like reference characters indicate like or corresponding parts, although variations and modifications may be effected without departing from the spirit and scope of the novel concepts of the disclosure, and in which:

FIG. 1 is a side elevation of a pair of chains which are meshed with respective sprockets to effect an interlocking or separation of the two chains;

FIG. 2 is a front view of one of the chains illustrated in FIG. 1; and

FIG. 3 is a view similar to FIG. 2 illustrating the application of the invention to a multiple roller chain.

DETAILED DESCRIPTION OF THE INVENTION

Referring to the drawing and more particularly to FIGS. 1 and 2 thereof, reference numerals 1a and 1b designate respective roller-type chain structures, each of which, as illustrated in FIG. 2 comprise a series of rollers 2 which may be, for example, by supported on respective pins 3. Each pin 3 is connected to the adjacent pin in leading direction and adjacent pin in trailing direction by respective pairs of sideplates 4, all of such sideplates in the embodiment illustrated in FIGS. 1 and 2 being identical in construction. In such embodiment, the pins 3 are provided at each end thereof with rivet heads 5 operative to retain the associated roller and sideplates in assembled relation.

As clearly illustrated in FIG. 1 each sideplate 4 has a base or body portion 6 having a pair of bores therein through which respective pins 3 extend. Each sideplate is provided with a hooklike portion 7 the free end 8 of which extends generally in the direction of the extended chain, and disposed adjacent the hook portion is a recess 9 which is generally complemental in shape to the hook portion 8 with the opposite part of the portion 7 having an inclined edge 11.

Each of the chains 1a and 1b is adapted to be passed over a corresponding sprocket 12a and 12b, which sprockets are disposed on parallel axes and so spaced that the respective chains may be properly meshed with the sprockets when the chains are in assembled relation as illustrated in FIG. 1. The chains are disposed about their respective sprockets with the hook portions 7 of the one chain disposed in inverted or reversed position with respect to the hook portion 7 of the other chain whereby the free end 8 of each hook portion of the one chain may seat in the recess 9 of the cooperable hook portion of the other chain.

In interlocking or separating the two chains, the portions of the chains below the sprockets 12a and 12b are extended in diverging or opposite directions as illustrated whereby the respective hook portions on the two chains may be interlocked as the chains are moved upwardly between the two sprockets or separated as the chains move downwardly between the two sprockets. The interlocking and separating action thus is somewhat analogous to the closing and opening of a common zipper closure, and while the hook portions of the respective chains readily interlock or separate as they pass between the two sprockets, the interlocked chains form an unusually rigid assembly that may be readily used for the transmission of push or compression forces with a minimum of guiding structure. It will be appreciated that guiding elements, such as the elements 13 may be employed to insure the desired direction of movement of the chain and prevent a possible tendency of the chains to pivot about one of the sprocket axes. However if the extreme end of the chain is suitably supported or guided further guiding means may not be required.

It will be appreciated that in the chain structure illustrated in FIG. 2, utilizing two series of sideplates at each end of the rollers 2, any one or more of such series may be provided with the interlocking hook elements, or as illustrated, all of such series may be provided therewith. In practice, in most cases it would be desirable to provide hook elements on at least one series of sideplates at each end of the rollers.

The present invention may also be utilized in connection with multiple roller chain, such as illustrated in FIG. 3, in which three series of rollers are employed, respectively comprising the rollers 2, 2' and 2" in which two series of sideplates are disposed between each adjacent series of rollers, such intermediate plates being constructed in the same manner as the sideplates 4. In such case multiple sprockets likewise would be employed for engagement with the respective series of rollers, and a previously mentioned with respect to the construction of FIG. 2 selected series of side or intermediate plates may be provided with hook elements or, as in the construction of FIG. 2 all of the plates may be so formed. Where only some of the series of plates are provided with hook elements the selected series should be symmetrical with respect to the longitudinal axis of the chain so that proper alignment of interlocking series of plates on the respective chains will be achieved.

It will be appreciated that the present invention offers decided advantages over prior arrangements enabling the formation of an interlocked assembly that possesses a very high degree of rigidity for its size, enabling the formation of a relatively rigid elongated structure of considerable length but which may occupy a minimum amount of space when the chains are in separated condition. In other words the invention enables the formation of an elongated relatively rigid member of any desired length within fabrication limits but which, in effect, has no fixed minimum length in the extended direction.

It will also be noted that the construction is extremely simple and substantially foolproof in operation, requiring a minimum amount of actuating mechanism.

I claim:

1. In an interlocking rigid chain structure of the roller type, the combination of a pair of interlockable chain members, each comprising a plurality of pairs of inner side plates and a plurality of pairs of outer sideplates, each sideplate having a pair of spaced bores therein with such bores being uniformly spaced in all sideplates, the inner pairs of plates being disposed in two laterally aligned series each lying in one of a pair of spaced parallel planes with the bores of each pair of sideplates in alignment, roller means in alignment with corresponding bores of each pair of sideplates and disposed therebetween, the outer pairs of sideplates being disposed in two laterally aligned series, each lying in one of a pair of spaced parallel planes at the exterior of the respective series of said inner sideplates, respective pairs of corresponding bores in each pair of outer sideplates each being aligned with the adjacent pair of corresponding bores of the adjacent cooperable pair of inner sideplates, and pins passing through aligned bores in the inner and outer sideplates and through the respective associated roller aligned therewith to form a connected structure, a pair of sprockets rotatably disposed on spaced parallel axes extending transverse to the chain members when they are interlocked, each sprocket adapted to receive one of said chain members and dispose the same in closely adjacent parallel relation with respect to the other chain member, each chain member having the sideplates of at least one series at each side thereof provided with respective hook portions, each extending laterally outward and terminating in an extreme end portion extending generally in the direction of the chain members when interlocked, all of the sideplates having such hook portions being of like construction with each of the series involved having all sideplates thereof provided with such hook portions, like series at the respective sides of the two chain members carrying such hook portions, with the hook portions on one of such like series being reversed in direction with respect to those of the other of such like series, whereby each hook portion of the one series may be cooperably interlocked with an adjacent hook portion of the like series as the chain members pass around said sprockets into adjacent parallel relation, said hook portions of an interlocked pair being generally complemental and each sideplate of an interlocked pair having means thereon engaged with like means on the sideplate of the other like series, immediately adjacent to the sideplate of such interlocked pair, whereby such engaged means prevent disengagement of the hooked portions of such pair other than when said chain members pass around said sprockets in separating directions.

2. An interlocking chain structure according to claim 1, wherein said means on the respective sideplates engageable when such sideplates are interlocked comprises respective edges thereon disposed in abutting relation.

3. An interlocking chain structure according to claim 2, wherein said abutting edges each comprises an angularly extending edge of that portion of a sideplate forming the hook portion thereof.

4. An interlocking chain structure according to claim 3, wherein the hook portions are formed at both sides of the chain members on like series of sideplates.

5. An interlocking chain structure according to claim 4, wherein the hook portions are formed on series of both inner and outer sideplates whereby the respective hook portions on the inner sideplates are disposed along the respective chain members longitudinally intermediate the hook portions on successive outer sideplates.

6. An interlocking chain structure according to claim 1, wherein said chain members are each constructed in the form of a multiple chain having a plurality of series of rollers, each adjacent series being spaced by two series of intermediate plates.

7. A chain structure according to claim 6, wherein at least one corresponding series of intermediate plates on the chain members are of like construction and arrangement as the sideplates carrying said hook portions, and cooperatively engageable in the same manner.

8. An interlocking chain structure according to claim 7, wherein all of the side and intermediate plates are of like construction, whereby each pair of corresponding series of plates of the chain members are interlockable.

9. An interlocking chain structure according to claim 6, wherein said chain members are each constructed in the form of a multiple chain having a plurality of series of rollers, each adjacent series being spaced by two series of intermediate plates.

10. A chain structure according to claim 9, wherein at least one corresponding series of intermediate plates on the chain members are of like construction and arrangement as the sideplates carrying said hook portions, and cooperatively engageable in the same manner.

11. An interlocking chain structure according to claim 10, wherein all of the side and intermediate plates are of like construction, whereby each pair of corresponding series of plates of the chain members are interlockable.

* * * * *